L. JOHNSON.
SPEED REGULATOR.
APPLICATION FILED OCT. 9, 1913.
1,109,530.
Patented Sept. 1, 1914.
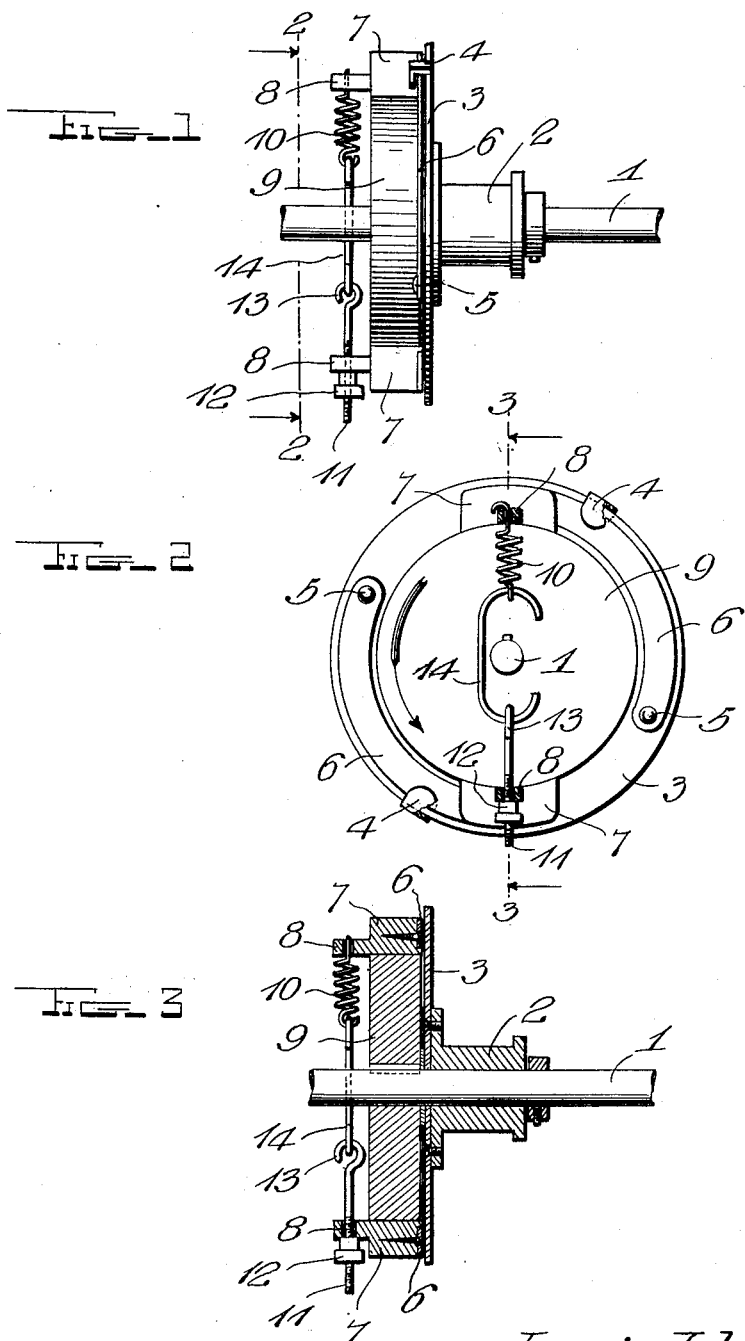
Witnesses
Inventor
Louis Johnson
By H. B. Willson & Co.
Attorneys

UNITED STATES PATENT OFFICE.

LOUIS JOHNSON, OF WEBSTER TOWNSHIP, RICE COUNTY, MINNESOTA.

SPEED-REGULATOR.

1,109,530.  Specification of Letters Patent.  Patented Sept. 1, 1914.

Application filed October 9, 1913. Serial No. 794,304.

*To all whom it may concern:*

Be it known that I, LOUIS JOHNSON, a citizen of the United States, residing at Webster township, in the county of Rice and State of Minnesota, have invented certain new and useful Improvements in Speed-Regulators; and I do declare the following to be a full, clear, and exact description of the invention, such as will enable others skilled in the art to which it appertains to make and use the same.

This invention relates to machine elements, and more especially to machine brakes; and the object of the same is to produce a centrifugal speed regulator capable of being interposed between the motor and the grindstone, churn, cream separator, or other machinery which is driven thereby, to the end that the machine will rotate at first at its regular or driving speed but as the speed increases the brake will automatically relax slightly so that the machine may run a little slower. This end is carried out by constructing the regulator in the manner hereinafter more fully described and claimed, and as shown in the drawings wherein—

Figure 1 is a side elevation of this improved regulator, Fig. 2 an end elevation as seen from the line 2—2 of Fig. 1, and Fig. 3 a vertical section on the line 3—3 of Fig. 2.

Journaled on a shaft 1 is a pulley 2 having removably secured at one end a large flange 3 which may well be of sheet metal, and at two or more points the edges of the flange carry hooks 4. In the drawings I have shown two such hooks, and therefore there will be two brake shoes and connections therefor. Pivoted at 5 at substantially diametrically opposite points on to the flange are curved arms 6 which underlie the hooks 4 near their free ends so that said hooks limit the outward movement of the arms, and beyond said hoods the free extremities of the arms 6 carry brake shoes or blocks 7 which are preferably of wood and each of which has an ear 8. The shoe stands near the flange or disk 3 and its inner face is curved to make contact with a large iron fly wheel 9 which is mounted fast on the power shaft 1. To one of said ears is connected a coiled contractile spring 10, and through the other passes loosely the shank of a screw 11 receiving a nut 12 on its outer end, its inner end 13 being hooked. The hook 13 is connected with the inner end of the spring by means of a link 14 which may well be of the shape shown so that it spans the power shaft 1 and does not interfere therewith.

In the use of this speed regulator it is interposed between the motor and the machine being driven, the latter being belted to the pulley 2 and the motor being belted to the power shaft by means not necessary to illustrate. The motor being started up, the power shaft 1 is driven and with it revolves the heavy iron wheel 9 in the direction of the arrow. The spring draws the two shoes against opposite faces of this wheel and causes the rotation of the flange 3, the pulley 2, and the machine belted thereto and being driven. As the speed of rotation increases centrifugal force is generated in the shoes 7 and they fly outward slightly expanding the spring which holds them normally against the faces of the fly wheel 9, so that the latter and the power shaft now revolve more rapidly than the pulley 2 and the machine being driven. Should the load be so heavy or the work being done be increased at any time to such an extent as to seriously retard the rotation of the flange, the spring draws the shoes again into closer contact with the edges of the wheel 9, and the speed of the flange and the pulley 2 is accelerated. In other words, so long as the load is not heavy and the power shaft and wheel 9 revolve rapidly, the friction blocks slip slightly over the face of the wheel 9 and the machine will not be driven at an excessive rate of speed; but as soon as the load becomes heavier, or if the load be a large one from the start, the frictional contact of said shoes with the wheel 9 causes them to rotate in unison therewith. I would make all parts of iron excepting the shoes or blocks 7 and the pulley 2, and these might well be of wood. The exact details and proportions are not essential.

What is claimed as new is:

1. In a speed regulator, the combination with a main shaft, a fly wheel fast thereon, and a driven pulley loose thereon and having a flange extending beyond the periphery of said fly wheel; of a pair of curved arms pivoted at one end to said flange at opposite points thereon, hooks on the flange overlying the bodies of said arms to limit the outward swinging movement of the latter, a pair of shoes carried by the other ends of said arms and standing adjacent the periphery of the fly wheel, and means for drawing said shoes toward each other with yielding force.

2. In a speed regulator, the combination with a main shaft, a fly wheel fast thereon, and a driven pulley loose thereon and having a flange extending beyond the periphery of said fly wheel; of a pair of curved arms pivoted at one end to said flange at opposite points thereon, hooks on the flange overlying the bodies of said arms to limit the outward swinging movement of the latter, a pair of shoes carried by the other ends of said arms and standing adjacent the periphery of the fly wheel, each shoe having a lateral ear, a spring connected with one ear, a hook whose shank passes loosely through the other ear and is threaded, a link connecting the bill of the hook with the inner end of the spring, and a set screw on the outer end of said shank.

3. In a speed regulator, the combination with a main shaft, a fly wheel mounted to rotate therewith, a driven pulley loosely mounted on said shaft immediately adjacent said fly wheel and an enlarged flange removably secured to one end of said pulley between the latter and said fly wheel; of a pair of arcuate arms pivotally secured at one end to said flange at substantially diametrically opposite points thereon, said arms extending in opposite directions on the pulley, hook members formed on the peripheral edge of said flange at diametrically opposite points thereon, said hook members extending inwardly and overlying portions of said arcuate arms to limit the outward swinging movement of the latter with respect to the flange, brake shoes carried on the free ends of said arms and designed for contact with the periphery of said fly wheel, laterally extending ears carried on said shoes, a coil spring having one end thereof engaged with one of said ears, a hook member having a threaded shank loosely disposed through the other of said ears, connecting means between said hook member and the other end of said coil spring, and means in connection with the threaded shank of said hook member and the last mentioned ear to adjustably secure the former in place with respect to the latter and also afford a means for the adjustment of the tension of said spring.

In testimony whereof I have hereunto set my hand in presence of two subscribing witnesses.

LOUIS JOHNSON.

Witnesses:
CHARLES R. PYE,
D. J. WHITING.